United States Patent
Chang

(10) Patent No.: US 7,764,448 B2
(45) Date of Patent: Jul. 27, 2010

(54) CAMERA LENS MODULE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 63 days.

(21) Appl. No.: 12/110,536

(22) Filed: Apr. 28, 2008

(65) Prior Publication Data
US 2008/0266684 A1   Oct. 30, 2008

(30) Foreign Application Priority Data
Apr. 29, 2007  (CN) .................... 2007 1 0200560

(51) Int. Cl.
*G02B 7/02* (2006.01)
(52) U.S. Cl. .................. 359/824; 359/822; 359/829
(58) Field of Classification Search .................. 359/824
See application file for complete search history.

(56) References Cited

U.S. PATENT DOCUMENTS
2007/0046109 A1*  3/2007  Ho et al. ...................... 310/12
2007/0116445 A1*  5/2007  Kozakai et al. ............... 396/55

FOREIGN PATENT DOCUMENTS
| CN | 1763577 A | 4/2006 |
| CN | 1786808 A | 6/2006 |
| CN | 1894953 A | 1/2007 |
| CN | 1910491 A | 2/2007 |

* cited by examiner

*Primary Examiner*—Jessica T Stultz
(74) *Attorney, Agent, or Firm*—Andrew C. Cheng

(57) ABSTRACT

A lens module includes a lens barrel, a lens holder, a base, a plurality of elastic guiding members secured on the base and a plurality of electromagnetic devices arranged on the base. The lens barrel has a plurality of optical components received therein, and outer screw threads formed on an outer wall thereof. The lens holder has inner screw threads formed on an inner wall thereof to engage with the outer screw threads of the lens barrel. A plurality of supporting bars and magnetic elements are secured on an outer wall of the lens barrel. The guiding members each is formed on the base and configured for inserting of the respective supporting bar therein to guide a movement of the lens holder. The electromagnetic devices each locates at opposite sides of the respective magnetic element of the lens holder to provide a force to drive the lens holder.

16 Claims, 5 Drawing Sheets

CAMERA LENS MODULE

BACKGROUND OF THE INVENTION

1. Field of the Invention

The present invention relates to camera lens, and particularly to a camera lens module used in portable electronic devices, such as mobile phones.

2. Description of Related Art

With the ongoing development of microcircuitry and multimedia technologies, digital cameras are now in widespread use. Portable electronic devices, such as mobile phones and personal digital assistants (PDAs), are being developed to be increasingly multi-functional. Many of these portable electronic devices are now equipped with a digital camera module.

In a typical camera module, a lens module is a key element in producing high quality pictures. Generally, a camera module includes a lens module and an image sensing module. Optical image signals are focused by the lens module onto the image sensing module. The image sensing module transforms the optical image signals into electronic image signals. When a distance between the lens module and the image sensing module is adjusted, the definition of the optical image signals received by the image sensing module is also changed. Focusing mechanisms are widely used in camera modules (both digital and film-based) for creating high quality photos.

Conventionally, the lens module includes a lens barrel, a lens holder for receiving the lens barrel therein, and a motor for performing the focusing process. The motor drives the lens barrel to rotate threadedly in the lens holder for focusing. However, most motors have complex configurations, which increases the cost of the camera module. In addition, a friction exists between the lens holder and the lens barrel, which retards the movement of the lens barrel resulting in a low efficiency of the camera module.

What is needed, therefore, is an improved camera lens module. The lens module has a guiding member therein to guide the movement of the lens holder without lags.

SUMMARY OF THE INVENTION

A lens module includes a lens barrel, a lens holder, a base, a plurality of elastic guiding members secured on the base and a plurality of electromagnetic devices arranged on the base. The lens barrel has a plurality of optical components received therein, and outer screw threads formed on an outer wall thereof. The lens holder has inner screw threads formed on an inner wall thereof to engage with the outer screw threads of the lens barrel. A plurality of supporting bars and magnetic elements are secured on an outer wall of the lens barrel. The guiding members each is formed on the base and configured for inserting of the respective supporting bar therein to guide a movement of the lens holder. The electromagnetic devices each locates at opposite sides of the respective magnetic element of the lens holder to provide a force to drive the lens holder.

Other advantages and novel features of the present invention will become more apparent from the following detailed description when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
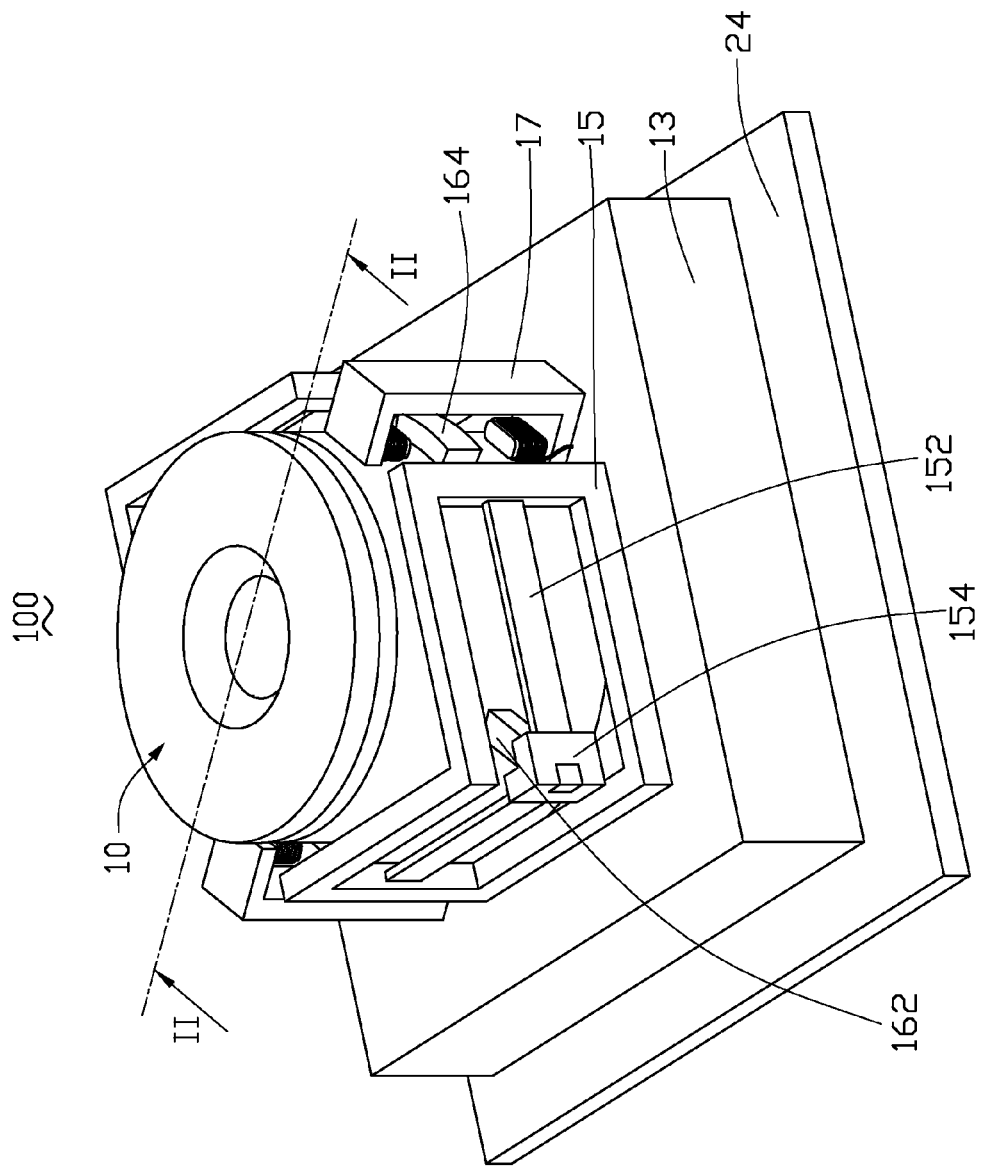
FIG. 1 is an isometric view of a camera module in accordance with a first embodiment of the present invention.
Figure 2:
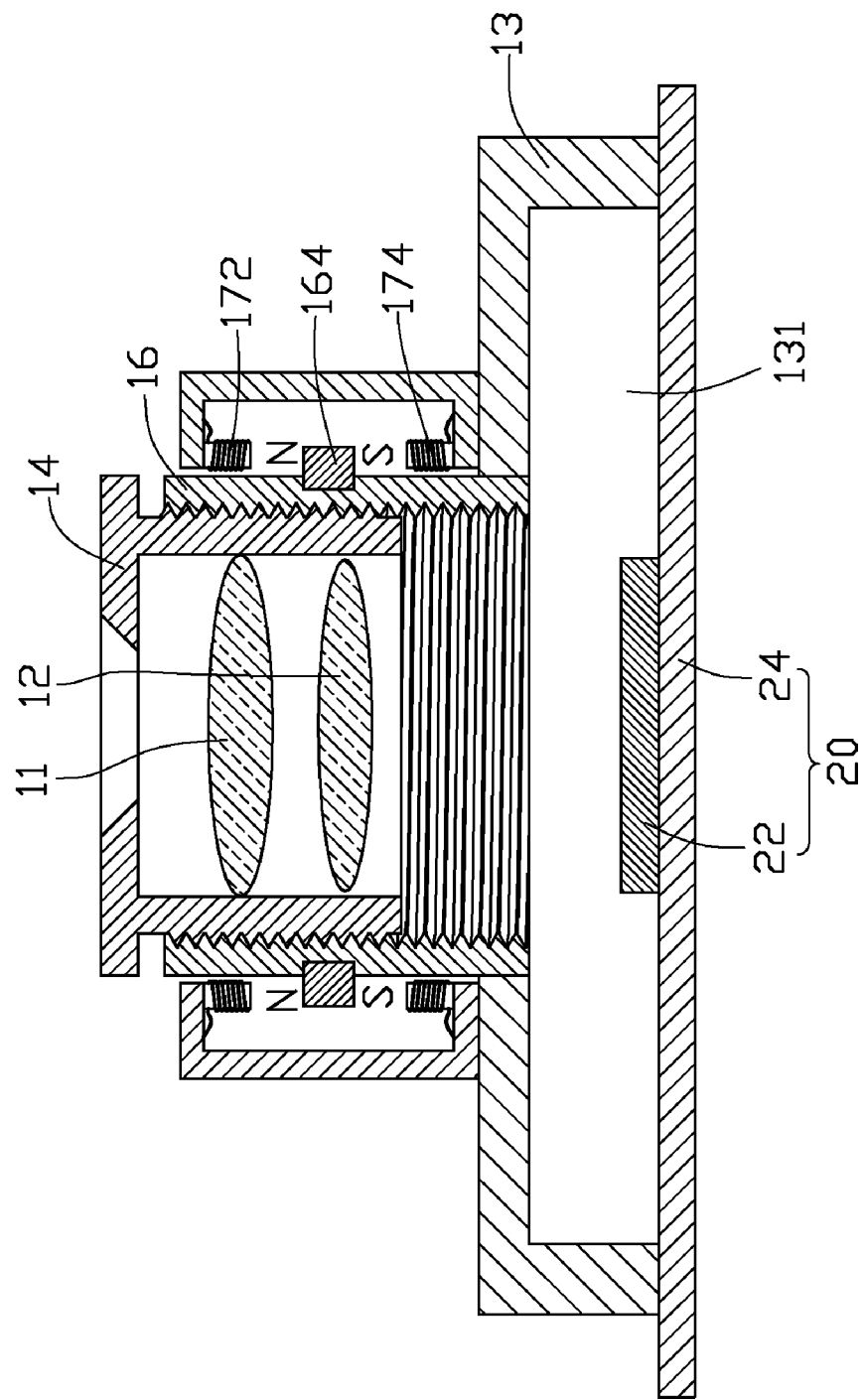
FIG. 2 is a schematic, cross-sectional view of the camera module in FIG. 1, taken along line II-II.

Referring to FIGS. 1-2, a camera module 100 in accordance with a first embodiment of the present invention comprises an image sensing module 20 and a lens module 10 arranged on the image sensing module 20.

The lens module 10 comprises a base 13, a cylindrical lens holder 16 and a cylindrical lens barrel 14 engaged with the lens holder 16. The lens barrel 14 has two lenses 11 and 12 received therein. A pair of guiding members 15 and a pair of electromagnetic devices 17 are arranged on the base 13 and around the lens holder 16.

The lenses 11, 12 can be made of glass or plastic material. Outer screw threads (not labeled) are formed on an outer wall of the lens barrel 14. Inner screw threads (not labeled) are formed on an inner wall of the lens holder 16. The lens barrel 14 and the lens holder 16 are threadingly engaged with each other. A position of the lens barrel 14 relative to the lens holder 16 can be adjusted according to different requirements. Two supporting bars 162 extend outwardly from an outer wall of the lens holder 16. The two supporting bars 162 are symmetrical to an axis of the lens holder 16. Two magnetic elements 164, such as permanent magnets, are mounted on the outer wall of the lens holder 16. For conveniently description, a top end of each magnetic element 164 is defined as north (N) pole, and a bottom end of each magnetic element 164 is defined as south (S) pole. The two magnetic elements 164 are also symmetrical to the axis of the lens holder 16. The magnetic elements 164 and the supporting bars 162 are in a same horizontal level and evenly located around the lens holder 16 in an interval fashion.

The base 13 is made of plastic material. The base 13 has a recessed space 131 defined at a bottom end thereof and a center hole (not labeled) defined at a top end thereof communicating with the space 131. The lens holder 16 can pass through the hole and move along a mechanical axis thereof for focusing.

Each of the guiding members 15 is bent and has a right-angled configuration. Each of the guiding members 15 comprises a frame (not labeled), a retaining portion 154 at a center of the frame and two connecting strips 152 located symmetrically at two flanks of the retaining portion 154. The two connecting strips 152 connect the retaining portion 154 with two sides, i.e. right and left sides of the frame respectively. The connecting strips 152 are made of elastic material allowing the retaining portion 154 to move up and down at a certain range. A hole (not labeled) is defined in the retaining portion 154. The guiding members 15 can be made of a piece of metal plate with a thickness in a range of 0.2~1.0 millimeter by a punching process and then bent to form a right-angled configuration. In the present embodiment, the guiding members 15 are made of an alloy of aluminum and magnesium with a thickness of 0.3 millimeter. The two guiding members 15 are arranged around the lens holder 16 symmetrically. The two supporting bars 162 of the lens holder 16 insert into the holes of the retaining portions 154 of the two guiding members 15 respectively, and are secured by adhesive.

Each of the electromagnetic devices 17 has a first electromagnetic winding 172 at an upper end thereof and a second electromagnetic winding 174 at a bottom end thereof. Each of the first and second electromagnetic windings 172, 174 comprises a ferromagnetic plate (not labeled) and a winding (not labeled) wrapped around the ferromagnetic plate. Wrapping orientations of the two electromagnetic windings 172, 174 are opposite. The two electromagnetic devices 17 are arranged adjacent to the lens holder 16 corresponding to the position of the magnetic elements 164 to surround the magnetic elements 164 and secured on the base 13 by insert molding. The first electromagnetic winding 172 is adjacent to the N pole of the magnetic elements 164. The second electromagnetic winding 174 is adjacent to the S pole of the magnetic elements 164.

The image sensing module 20 comprises a circuit board 24 attached to the base 13 and an image sensor 22 mounted on the circuit board 24. The circuit board 24 electrically connects to the first and second electromagnetic windings 172, 174 and supply power, control signals, etc. to the first and second electromagnetic windings 172, 174. The image sensor 22 is received in the space 131 of the base 13. The image sensor 22 and the lenses 1, 12 are aligned perpendicularly for receiving optical signals passing therethrough.

When the first and second electromagnetic windings 172, 174 have no electricity, the location of the lens holder 16 is at a balance position where the connecting strips 152 have no elastic distortion. When electricity is supplied to the first and second electromagnetic windings 172, 174, magnetic poles of ends of the first and second electromagnetic windings 172, 174 which are adjacent to the magnetic elements 164 (i.e., a bottom end of the first electromagnetic winding 172 and an upper end of the second electromagnetic winding 174) are the same because of the opposite wrapping orientations thereof. Specifically, for example, when the first and second electromagnetic windings 172, 174 are supplied with electricity along a first direction, the bottom end of the first electromagnetic winding 172 generates an N pole, and the upper end of the second electromagnetic winding 174 generates an N pole. The first electromagnetic windings 172 push the magnetic elements 164, and the second electromagnetic windings 174 pull the magnetic elements 164. Thus, the lens holder 16 with the lenses 11, 12 can move down along a mechanical axis thereof for focusing. Due to the elasticity of the connecting strips 152 of the guiding members 15, the retaining portions 154 can move downward with the supporting bars 162 of the lens holder 16. The two connecting strips 152 evenly pull the supporting bars 162 of the lens holder 16 along two opposite directions (i.e., along clockwise and anticlockwise directions) at the horizontal level to prevent the lens holder 16 rotating along the axis of the lens holder 16.

When the first and second electromagnetic windings 172, 174 are supplied with electricity along a second direction opposite to the first direction, the lens holder 16 moves up along the mechanical axis thereof to perform another focusing process. Compared with the lens holder held and guided by screw threads in conventional camera module, the guiding member 15 of the present invention can guide the movement of the lens holder 16 with no lag.

Figure 3:
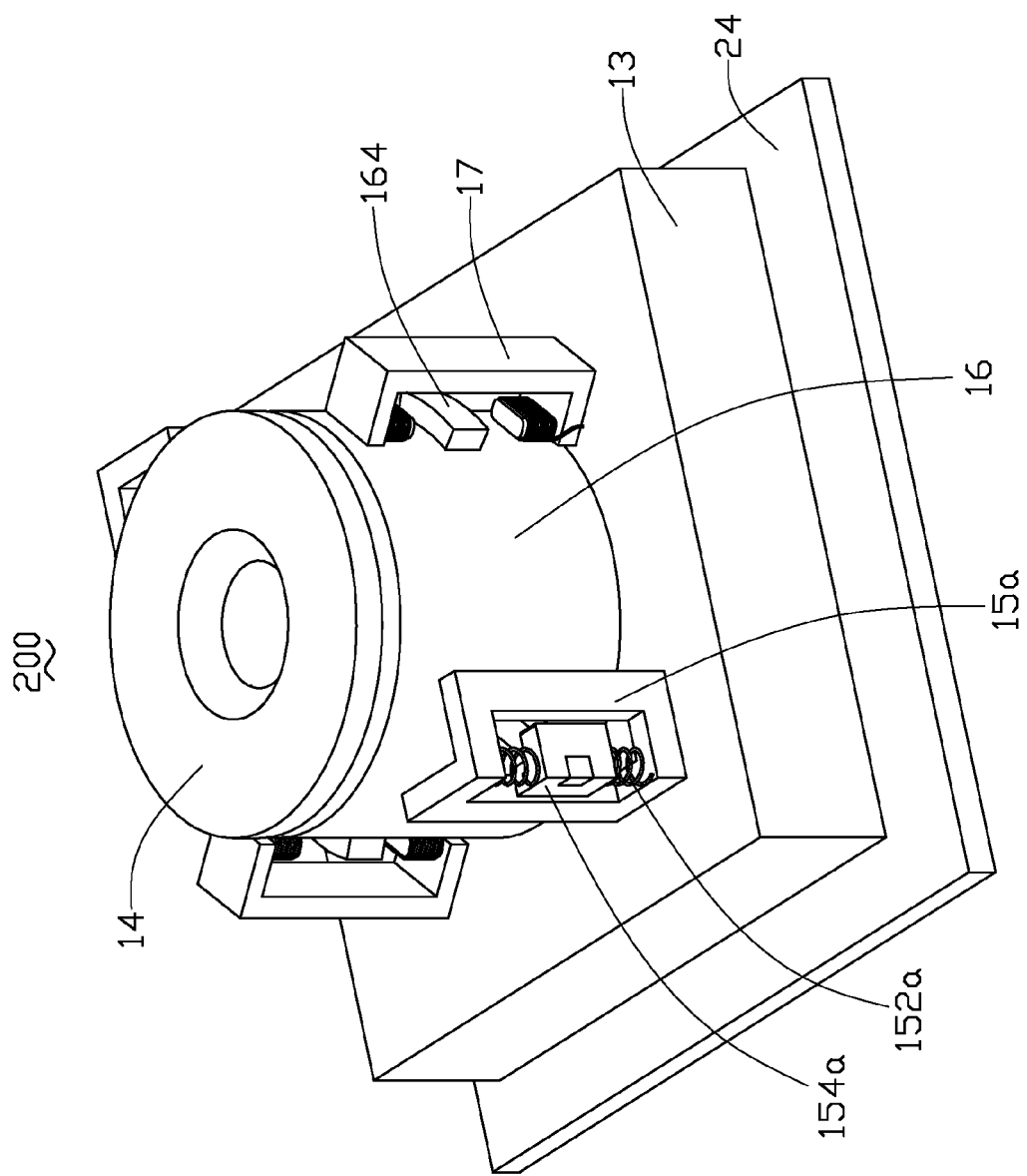
FIG. 3 is an isometric view of a camera module in accordance with a second embodiment of the present invention.

Referring to FIG. 3, a camera module 200 in accordance with a second embodiment of the present invention is shown. The camera module 200 is similar to the camera module 100 of the first embodiment of the present invention. The differences therebetween are that springs 152a of each of the guiding members 15a replace the connecting strips 152 of each of the guiding members 15; and the springs 152a are parallel to the axis of the lens holder 16, i.e., the springs 152a connect a retaining portion 154a and top and bottom sides of the frame of each of the guiding members 15a respectively.

Figure 4:
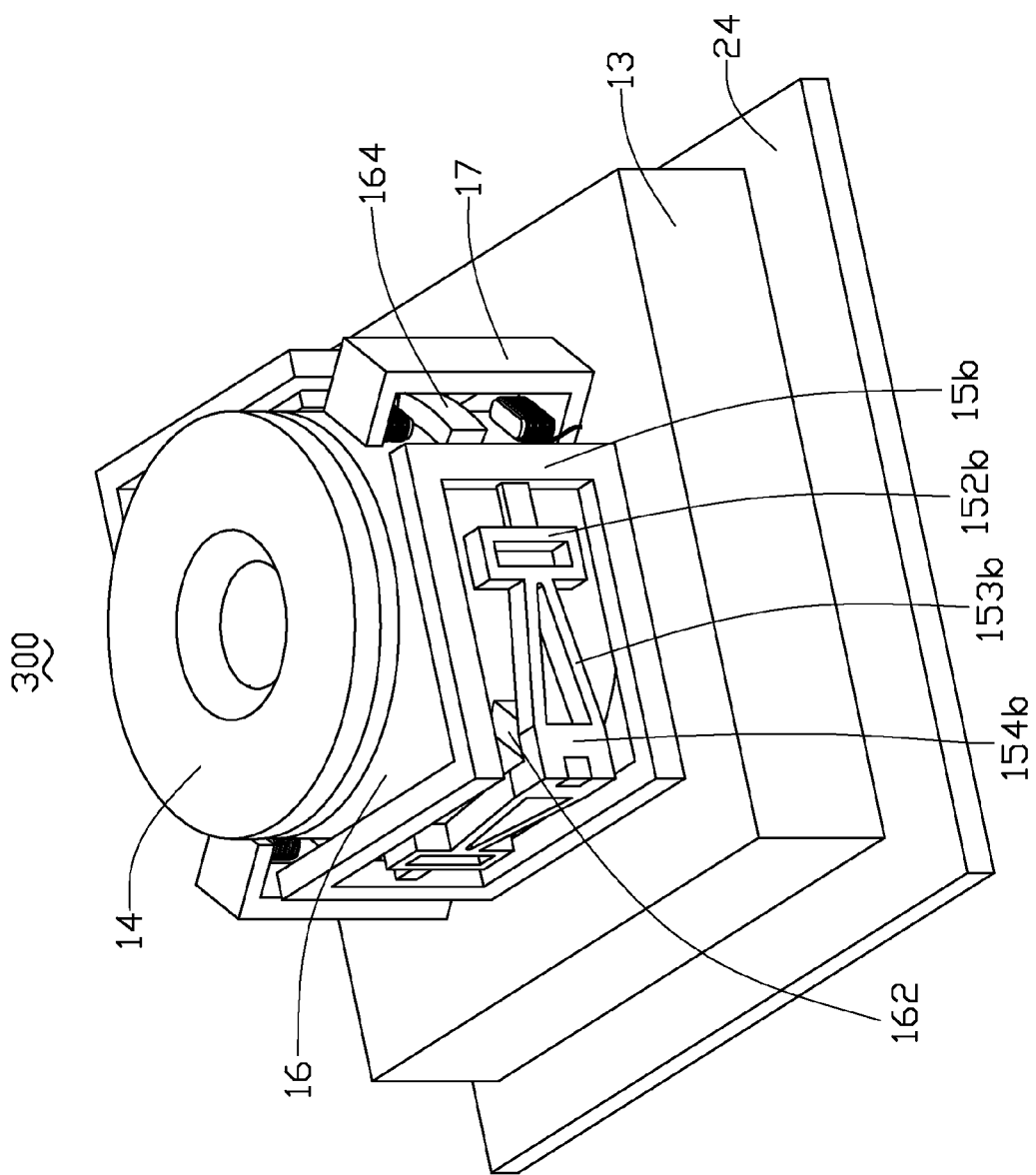
FIG. 4 is an isometric view of a camera module in accordance with a third embodiment of the present invention.

Referring to FIG. 4, a camera module 200 in accordance with a third embodiment of the present invention is shown. The camera module 300 is similar to the camera module 100 of the first embodiment of the present invention. The differences are that the connecting strips 152 of each of the guiding members 15 are replaced by an isosceles triangle-shaped connecting portion 153b and a traversed T-shaped connecting portion 152b. The triangle-shaped connecting portions 153b and a top of the T-shaped connecting portions 152b of each of the guiding member 15b are hollowed. A bottom side of the triangle-shaped connecting portion 153b connects to the retaining portion 154b. A top of the triangle-shaped connecting portion 153b connects to a top of the T-shaped connecting portion 152b. Compared with the connecting strips 152 of the guiding member 15 of the first embodiment of the present invention, the triangle-shaped connecting portions 153b and the T-shaped connecting portions 152b have higher intensity.

Figure 5:
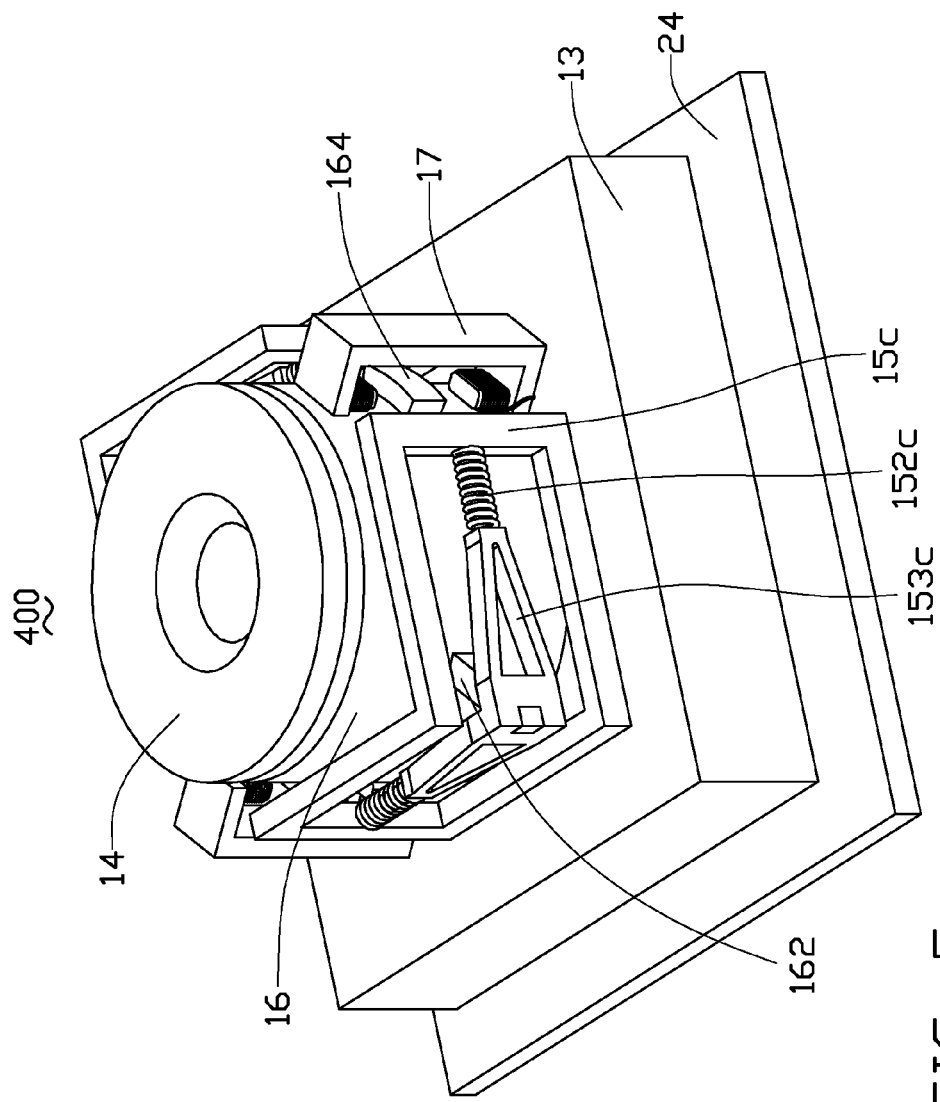
FIG. 5 is an isometric view of a camera module in accordance with a fourth embodiment of the present invention.

Referring to FIG. 5, a camera module 400 in accordance with a fourth embodiment of the present invention is shown. The camera module 400 is similar to the camera module 300 of the third embodiment of the present invention. The differences are that the traversed T-shaped connecting portions 152b of each of the guiding member 15b are replaced by a spring 152c. In other words, the springs 152c of each of a guiding member 15c connect a top of triangle-shaped connecting portions 153c and a side of frame of the guiding member 15c.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens module, comprising:
    a lens barrel;
    a plurality of lenses received in the lens barrel;
    a lens holder, the lens barrel threadedly engaged in the lens holder, and the lens holder having an outer surface, a plurality of supporting bars extending from the outer surface and a plurality of magnetic elements secured on the outer surface;
    a base;
    a plurality of elastic guiding members formed on the base, a distal free end of each of the supporting bars being inserted in the respective elastic guiding member; and
    a plurality of electromagnetic devices each arranged at opposite sides of the respective magnetic element, each electromagnetic device configured for interacting with the respective magnetic element to move the lens holder and each elastic guiding member configured for preventing the lens holder from rotating.

2. The lens module as claimed in claim 1, wherein the plurality of supporting bars includes two supporting bars symmetrically extending from opposite sides of the lens holder, and the plurality of magnetic elements includes two magnetic elements symmetrically secured on another two opposite sides of the lens holder, the supporting bars and the magnetic elements arranged in an alternate fashion.

3. The lens module as claimed in claim 2, wherein the two supporting bars and the two magnetic elements are coplanar.

4. The lens module as claimed in claim 1, wherein the elastic guiding members each comprise a frame, a retaining portion at a center of the frame and two elastic portions symmetrically located at two flanks of the retaining portion and connecting the retaining portion and two sides of the frame respectively.

5. The lens module as claimed in claim 4, wherein the retaining portion defines a hole therein with the distal free end of the corresponding supporting bar inserted therein.

6. The lens module as claimed in claim 4, wherein each of the elastic portions is a spring or an elongated resilient metal strip.

7. The lens module as claimed in claim 4, wherein the elastic portions are a combination of a spring and a metal strip.

8. The lens module as claimed in claim 4, wherein each of the elastic guiding members has a right angle configuration.

9. The lens module as claimed in claim 1, wherein the electromagnetic devices each comprise a first electromagnetic winding at a top thereof and a second electromagnetic winding at a bottom thereof, and the two electromagnetic windings generate opposite magnetic poles to act with the magnetic element.

10. A camera module, comprising:
a lens barrel having outer screw threads on an outer surface thereof;
a plurality of optical components received in the lens barrel;
a lens holder receiving the lens barrel therein, the lens holder having inner screw threads formed on an inner wall thereof to engage with the outer screw threads of the lens barrel, and having a plurality of supporting bars and a plurality of magnetic elements secured on an outer wall;
a base with a recessed space defined at a bottom thereof and a hole defined at a top thereof, the hole in communication with the space;
a plurality of elastic guiding members formed on the base, a distal end of each of the supporting bars being inserted in the respective guiding member;
a plurality of electromagnetic devices arranged at opposite sides of the magnetic element, each electromagnetic device configured for interacting with the respective magnetic element to move the lens holder and each elastic guiding member configured for preventing the lens holder from rotating; and
an image sensor received in the space of the base.

11. The camera module as claimed in claim 10, wherein the guiding members each comprise a frame, a retaining portion at a center of the frame and two elastic portions symmetrically located at two flanks of the retaining portion and connecting the retaining portion and two sides of the frame respectively.

12. The camera module as claimed in claim 11, wherein the retaining portion defines a hole therein with the distal end of the corresponding supporting bar inserted therein.

13. The camera module as claimed in claim 11, wherein each of the elastic portions is a spring or an elongated resilient metal strip, or a combination of a spring and an elongated resilient metal strip.

14. The camera module as claimed in claim 10, wherein the plurality of supporting bars includes two supporting bars symmetrically extending from opposite sides of the lens holder, and the plurality of magnetic elements includes two magnetic elements symmetrically secured on another two opposite sides of the lens holder, the supporting bars and the magnetic elements arranged in an alternate fashion.

15. The camera module as claimed in claim 14, wherein the plurality of guiding members includes two guiding members and the plurality of electromagnetic devices includes two electromagnetic devices, and the two guiding members are accommodated corresponding to the two supporting bars and the two electromagnetic devices are accommodated corresponding to the two magnetic elements.

16. The camera module as claimed in claim 15, further comprising a circuit board, wherein the image sensor is mounted on the circuit board, and the circuit board is attached to the base and electrically connected to the two electromagnetic devices.

* * * * *